Patented Dec. 15, 1942

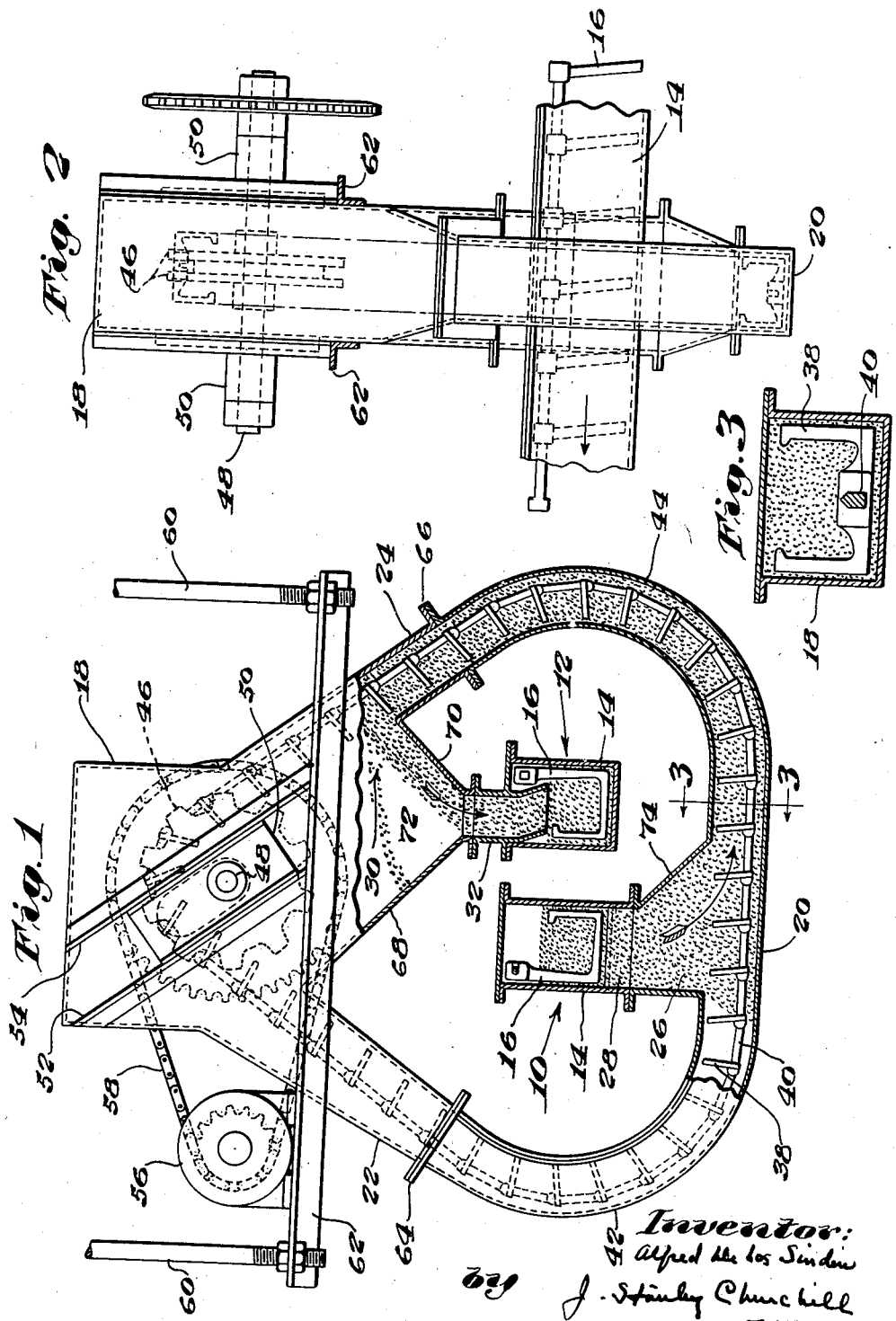

2,305,447

UNITED STATES PATENT OFFICE 2,305,447

MATERIAL TRANSFER APPARATUS

Alfred De Los Sinden, Aurora, Ill., assignor to Redler Conveyor Company, Quincy, Mass., a corporation of Massachusetts Application June 14, 1940, Serial No. 340,489

3 Claims. (Cl. 198—102)

This invention relates to a material transfer apparatus.

The invention has for an object to provide a novel and improved material transfer apparatus particularly adapted for transferring material from one conveyer to another in an efficient manner and preferably in a continuous stream.

With this general object in view and such others as may hereinafter appear, the invention consists in the material transfer apparatus and in the various structures, arrangements and combinations of parts hereinafter described and particularly defined in the claims at the end of this specification.

In the drawing illustrating the preferred embodiment of the invention, Fig. 1 is a side elevation of the material transfer apparatus, shown partly in cross-section, and illustrating the same in operative relation to the conveyers from and to which the material is to be transferred; Fig. 2 is an end view of the apparatus shown in Fig. 1; and Fig. 3 is a view in cross-section on the line 3—3 of Fig. 1.

In the installation of a conveyer system for conveying materials to different machines or devices or through different processing operations, it is sometimes desirable to discharge material from one conveyer into a different conveyer in the system. The usual manner of effecting such a transfer has been to arrange one conveyer immediately beneath the other and permit the upper conveyer to discharge the material directly into the lower conveyer by gravity. In practice, it has been found that some installations do not lend themselves to this practice, either because of the limited space apportioned for the installation or because it is necessary to maintain the conveyers at the same or nearly the same level to accommodate other parts of the conveying system.

In general, the present invention contemplates material transfer apparatus capable of transferring material from one conveyer to another, in installations where the two conveyers are arranged at the same or nearly the same level. In the preferred and illustrated embodiment of the invention, the transfer apparatus may comprise a novel construction of a loop type elevator conveyer capable of withdrawing material from one conveyer and delivering such material to another conveyer in a continuous stream. The loop type elevator may preferably comprise a casing or conduit having an endless conveying element arranged to be drawn through the conduit to effect the conveyance of the material therethrough, as will be described.

Referring now to the drawing, 10, 12 represent two material handling conveyers running side by side and at substantially the horizontal level, and which may form a part of a conveying system for conveying flowable solid material. By way of example, such conveyers may be, but are not necessarily, of the type illustrated and described in the United States patent to Sinden No. 2,155,874, which, as herein shown, comprises a trough or casing 14 through which a conveying element 16 is arranged to be drawn to effect the conveyance of the material therethrough.

In the preferred and illustrated embodiment of the invention, the material transferring apparatus may comprise a conduit or casing 18 extending in a general triangular path around the conveyers 10, 12 and including a horizontally disposed base portion 20 and inclined side portions or legs 22, 24. The base portion 20 is provided with an inlet 26 which is arranged to communicate with a discharge outlet 28 provided in the bottom of the horizontal conveyer 10. The inclined leg 24 of the casing 18, into which the material is elevated, is provided with a discharge outlet 30 which is arranged in direct communication with an inlet 32 provided in the top of the horizontal conveyer 12.

The casing or conduit 18 is preferably of rectangular form in cross section, as shown in Fig. 3, and is arranged to receive a conveying element comprising a plurality of pivotally connected flights 38 preferably of open or skeleton structure linked together by tension elements 40, herein shown as formed integrally with the flight members. As herein shown, the corner portions 42, 44 adjacent the base portion 20 of the casing are curved in order to guide the conveying element around the corners as it is drawn through the casing. The conveying element is arranged to run over a driving sprocket 46 disposed in the upper portion of the casing adjacent the intersection of the inclined side portions 22, 24. The sprocket 46 is mounted on a cross shaft 48 journaled in bearings 50 which may be slidably and adjustably mounted between guide bars 52, 54 secured to the sides of the casing. The shaft 48 may be driven in any usual or preferred manner such as by a motor 56 through a chain and sprocket drive 58. In practice, the device may be suspended from the ceiling or other supporting structure by suspension rods 60 which are connected to angle bars 62 secured to the sides of the casing and upon which the motor 56 is mounted.

As herein illustrated, the casing is preferably assembled in two sections, the lower section being connected to the upper section by flanged portions 64, 66 disposed intermediate the ends of the side portions 22, 24 of the casing. As shown in Fig. 2, the upper portion of the casing is made wider than the lower portion in order to permit the material being elevated into the leg 24 to fall freely into the inlet 32 of the conveyer 12. The discharge outlet 30 is made in the form of a funnel, having inclined or converging side walls 68, 70 extending inwardly from the side portions 22, 24 and which form a chamber 72 in which the material being elevated in the leg 24 may accumulate to some extent below the driving sprocket 46. The inlet 26 in the base portion 20 is provided with a side wall 74 inclined in the direction of the flow of the material to permit the material being discharged from the conveyer 10 to fall freely into the transfer apparatus.

From the above description, it will be observed that in the operation of the apparatus, when the conveying element is drawn through the casing in a counterclock-wise direction, the material falling through the discharge opening 28 from the conveyer 10 is engaged by the conveying element and carried around the curved portion 44 and into the leg 24 to be discharged into the conveyer 12 as indicated by the arrows. It will also be observed that the material leaves the flights 38 on the open side of the links so as to reduce to a minimum the possibility of any material being carried by the conveying element beyond the discharge outlet 30. However, any material which may be carried down the leg 22 will be recirculated and carried into the base portion 20 to join the material being discharged from the conveyer 10. It will be further observed that the apparatus thus produced is simple in construction and efficient in operation for the purpose of transferring material in a continuous stream from one to another of two adjacent conveyers, and finds particular utility in transferring material from and to conveyers arranged substantially at the same level.

While the preferred embodiment of the invention has been herein illustrated and described, it will be understood that the invention may be embodied in other forms within the scope of the following claims.

Having thus described the invention, what is claimed is:

1. In a conveyer system, the combination of two adjacent conveyors for flowable material each having a closed dust-proof casing, a third conveyor of the endless type extending in a closed path around said two conveyors, said third conveyor being provided with a dust-proof housing having a lower portion positioned below said adjacent conveyors and two upwardly extending side portions, said casing for one of said adjacent conveyors having an opening in the bottom thereof communicating in dust-proofed relation with the top of the lower portion of said housing to deliver material from said one conveyor to said third conveyor, one of said upwardly extending portions of said housing having an opening in its inner side communicating in dust-proof relation with said casing of the other of said adjacent conveyors to deliver material from said third conveyor to said other conveyor, and means for driving said third conveyor to transfer material from said one conveyor to said other conveyor.

2. In a conveyor system, the combination of two adjacent conveyors for flowable material each having a closed dust-proof casing, a third conveyor of the endless type extending in a closed path around said two conveyors, said third conveyor being provided with a dust-proof housing having a lower substantially horizontal portion positioned below said adjacent conveyors and two upwardly extending side portions, said casing for one of said adjacent conveyors having an opening in the bottom thereof communicating in dust-proofed relation with the top of the lower portion of said housing to deliver material from said one conveyor to said third conveyor, one of said upwardly extending portions of said housing being inclined from the vertical and extending over the other of said adjacent conveyors, said one portion of said housing having an opening in its inner and lower side communicating in dust-proof relation with said casing of said other conveyor to deliver material from said third conveyor to said other conveyor, and means for driving said third conveyor to transfer material from said one conveyor to said other conveyor.

3. In a conveyor system the combination of two adjacent conveyors for a flowable material each having a closed dust-proof casing, a third conveyor of the endless type extending in a closed path around said two conveyors said third conveyor being provided with a dust-proof housing having a lower substantially horizontal portion positioned below said adjacent conveyors and two upwardly extending side portions with curved portions connecting said lower portion and said side portions, said casing for one of said adjacent conveyors having an opening in the bottom thereof communicating in dust-proof relation with the top of the lower portion of said housing to deliver material from said one conveyor to said third conveyor, one of said upwardly extending portions of said housing being inclined from the vertical and extending over the other of said adjacent conveyors and joining the other of said upwardly extending portions, said inclined portion of said housing having an opening in its inner and lower side communicating in dust-proof relation with said casing of said other conveyor to deliver material from said third conveyor to said other conveyor and a single means within said housing adjacent the junction of the upwardly extending portions of said housing for driving said third conveyor to transfer materal from said one conveyor to said other conveyor.

ALFRED DE LOS SINDEN.